Feb. 3, 1959 E. M. KENNAUGH 2,872,675
DIELECTRIC REFLECTOR
Filed Nov. 13, 1956 6 Sheets-Sheet 3
FIG. 7
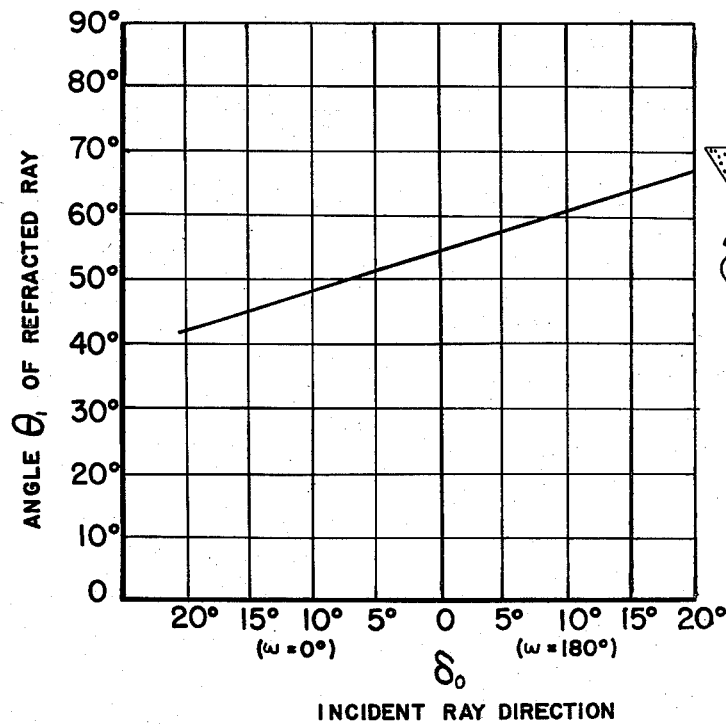
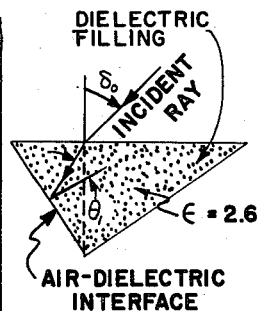
FIG. 8
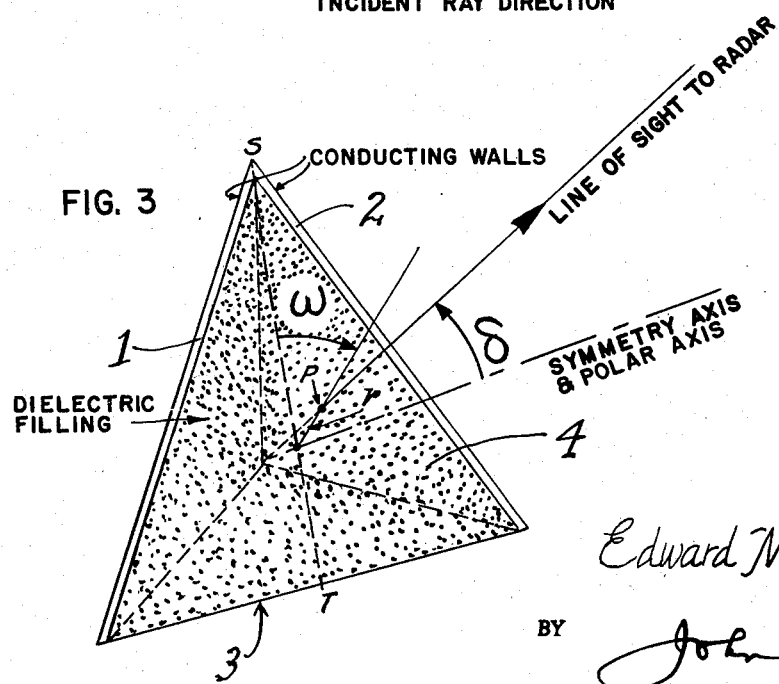
FIG. 3
INVENTOR
Edward M. Kennaugh
BY John B. Brady
ATTORNEY INVENTOR
Edward M. Kennaugh
BY John B. Brady
ATTORNEY United States Patent Office 2,872,675
Patented Feb. 3, 1959

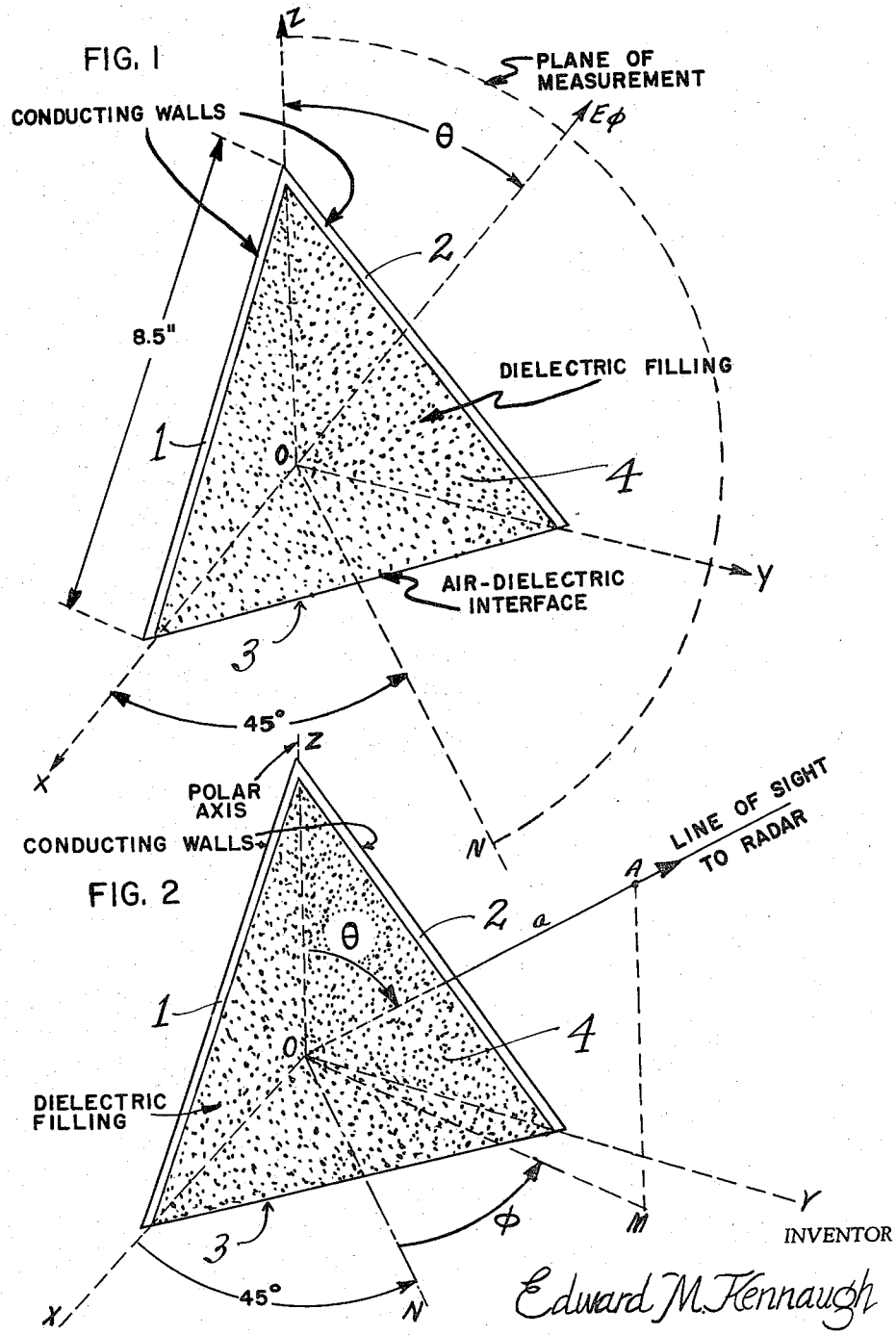

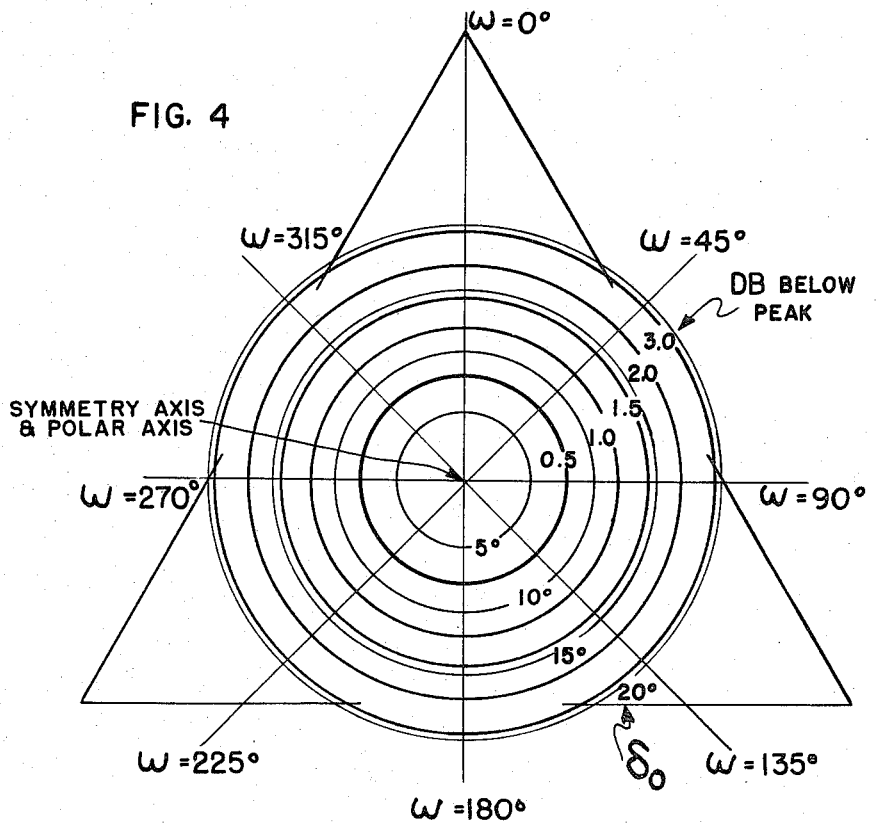
FIG. 4
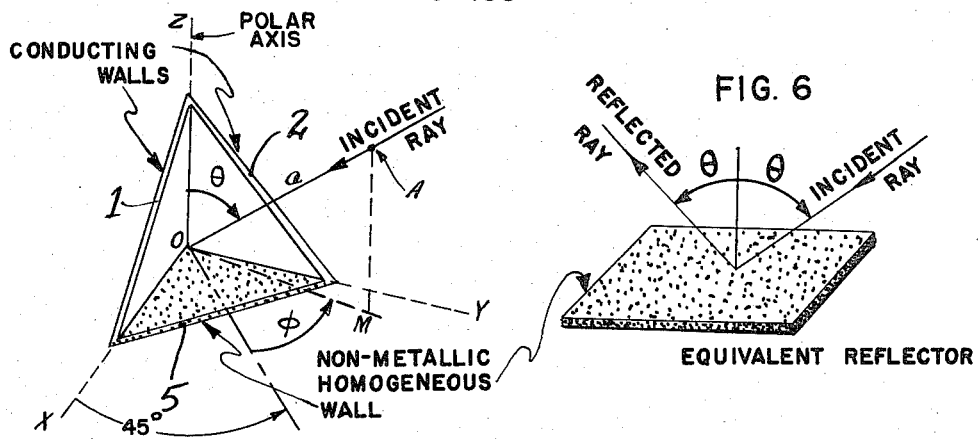
FIG. 5
FIG. 6

2,872,675

DIELECTRIC REFLECTOR

Edward M. Kennaugh, Columbus, Ohio, assignor to The Ohio State University Research Foundation, Columbus, Ohio, a corporation of Ohio Application November 13, 1956, Serial No. 621,954

5 Claims. (Cl. 343—18)

My invention relates broadly to radar systems and more particularly to a construction of dielectric reflector for use in radar systems.

Another object of my invention is to provide a construction of dielectric reflector for radar systems which yields approximately equal return for both linear and circular polarizations of electromagnetic energy.

Still another object of my invention is to provide a construction of dielectric reflector for use with circularly-polarized radars which returns a circularly polarized incident wave without reversal of sense of rotation.

A further object of my invention is to provide a construction of dielectric reflector for use with circularly-polarized radars having polarization properties which are essentially independent of frequency.

A still further object of my invention is to provide a construction of corner reflector for use with circularly-polarized radars formed by a composite arrangement of conducting walls and an air-dielectric interface forming a substantially triangular figure of three-dimensional characteristic filled with a low-loss dielectric material.

Other and further objects of my invention reside in the construction and arrangement of a dielectric-filled corner reflector having two conducting walls as set forth more fully in the specification hereinafter following by reference to the accompanying drawings, in which:

Fig. 1 is a perspective view of a corner reflector for use with circularly-polarized radars constructed in accordance with my invention;

Fig. 2 illustrates a dielectric-filled corner reflector for use with a spherical coordinate system with the polar axis coinciding with one of the corner legs, that is, the one perpendicular to the dielectric wall of the corner of the reflector;

Fig. 3 shows the application of the system of my invention to a spherical coordinate system with the polar axis extending along the symmetry axis of the corner of the dielectric reflector;

Fig. 4 is a theoretical diagram showing the coverage pattern obtainable from a conventional triangular corner reflector not applicable for circularly-polarized radars;

Fig. 5 is a perspective view of a corner reflector embodying my invention in which there is one non-metallic wall consisting of an air-dielectric interface at which total internal reflection occurs;

Fig. 6 is a theoretical view of an equivalent reflector similar to the wall shown in the form of my invention illustrated in Fig. 5 and showing the properties of the homogeneous non-metallic wall for reflecting the incident ray according to the reflective properties of this wall at the incidence angle $\theta$;

Fig. 7 is a graph illustrating the relation between the incident ray direction measured from the symmetry axis of the corner of my invention and the refracted angle $\theta$ at which this ray is reflected from the non-conducting wall, when the dielectric constant of the filling is 2.6;

Fig. 8 is a theoretical view more clearly illustrating the angular relationship of the incident ray as compared to the refracted ray when using the air-dielectric interface in the reflector structure;

Figure 13:
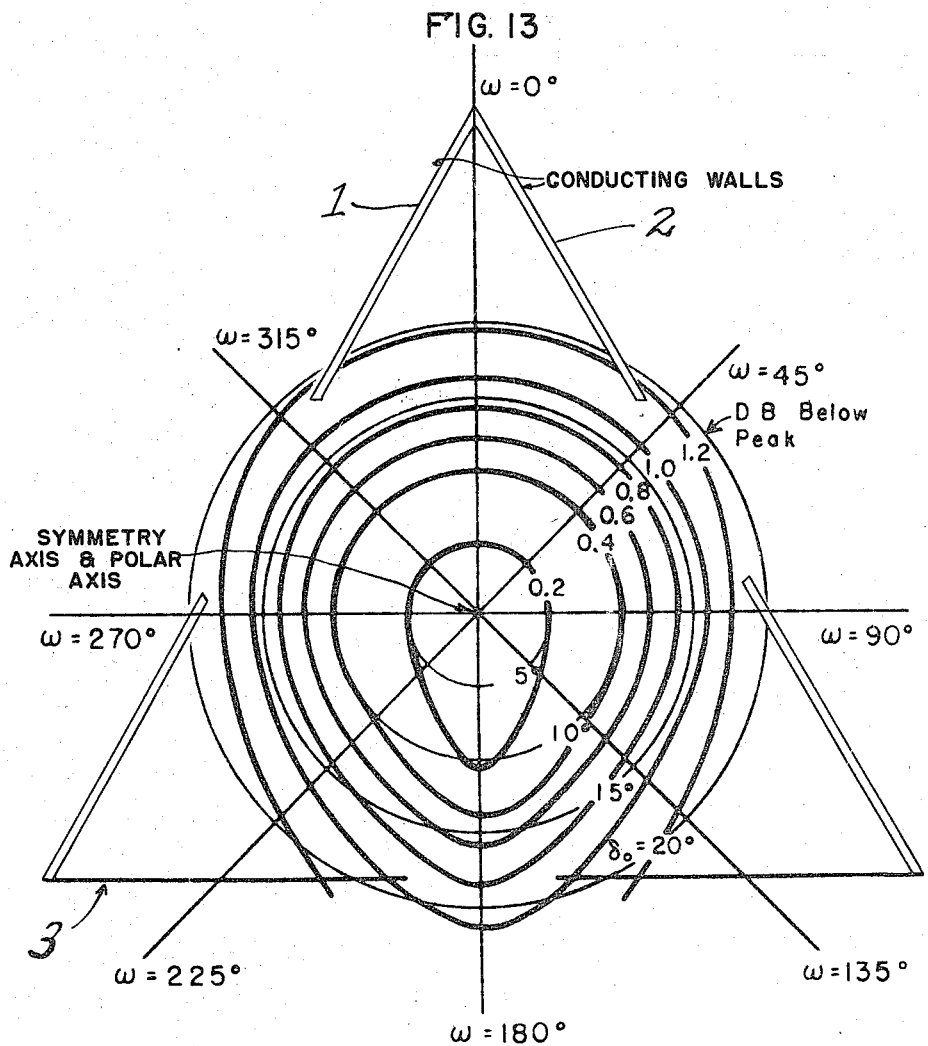
Figure 14:
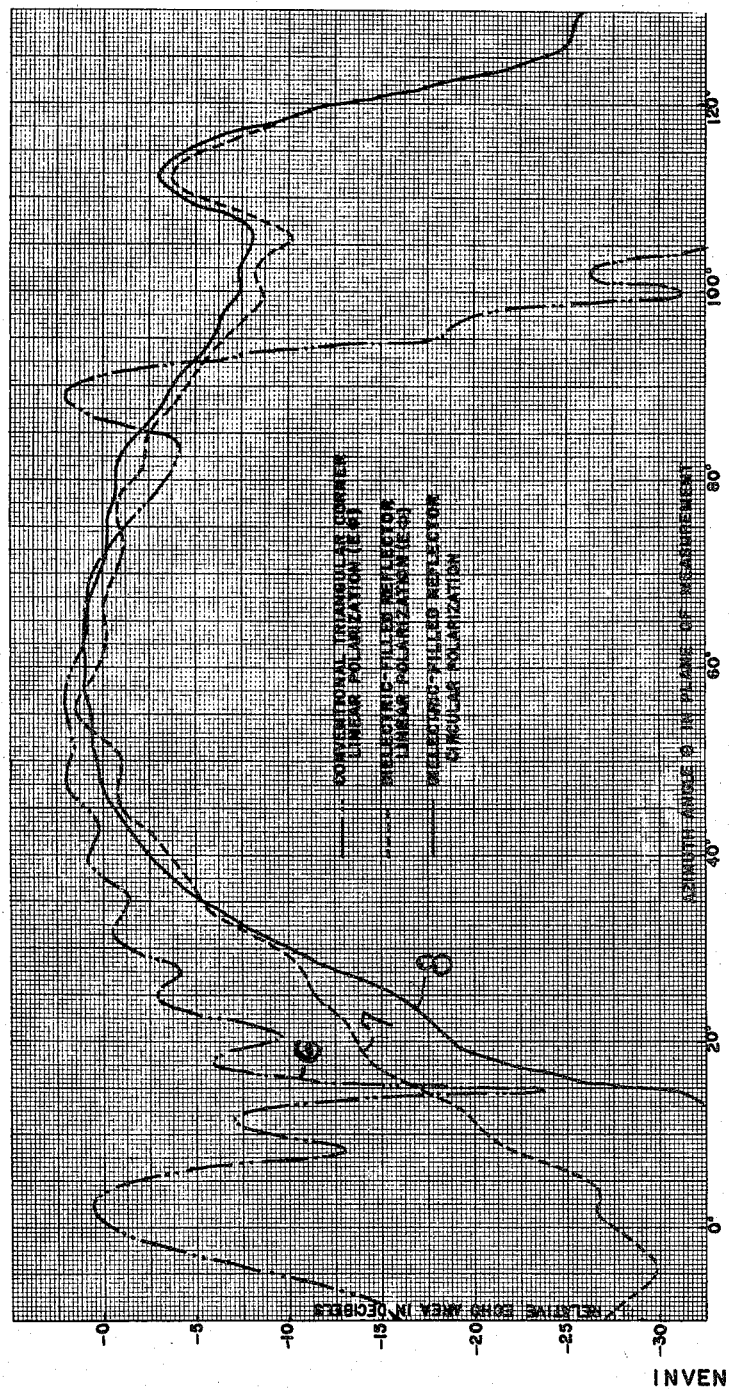

Fig. 13 is a diagram showing the computed coverage of the dielectric corner of Fig. 1 using the value of $\epsilon = 2.6$; and Fig. 14 is a graph comparing the relative echo area in decibels to azimuth angle $\theta$ in plane of measurement for conventional triangular corner linear polarization (E $\phi$), a paraffin-filled reflector having linear polarization (E $\phi$), and a paraffin-filled reflector for circular polarization according to my invention.

My invention is directed to the construction of a dielectric reflector for use with circularly-polarized radars wherein the reflector is constructed with two conducting walls and a third wall constituting an air-dielectric interface where the walls are mutually orthogonal lateral faces of a regular triangular-pyramid filled with a dielectric material of low-loss characteristic. This reflector has the form of a regular triangular pyramid whose lateral faces are mutually orthogonal. This solid pyramid is formed of a low-loss dielectric material. Two of the lateral faces have conductive coatings, and the third lateral face is uncoated. The lateral faces may be called "walls" of the reflector, since in normal operation these faces reflect optical rays, and the base of the pyramid may be called the "aperture" of the reflector, since optical rays enter and leave through this face.

The reflector of my invention returns a circularly-polarized incident wave without reversal of sense rotation. The polarization properties of the reflector of my invention are essentially independent of frequency. The construction of the corner reflector for use with circularly-polarized radars in accordance with my invention is such that the operational characteristics are accurately predictable so that a radar system may be designed with precision for carrying out certain prescribed requirements. Several coordinate systems may be used in determining the attitude of a corner reflector to a radar and to trace the passage of rays through reflection at each of the corner walls. In the specification hereinafter following I have explained the operation of the corner reflector using different coordinate systems. The corner reflector for use with circularly-polarized radars according to my invention has the distinct advantage over conventional triple-bounce corner reflectors as in such triple-bounce corner reflectors there is a reversal of incident waves upon reflection from each conducting wall so that after three reflections the returning wave is of opposite sense to the incident wave and is not receivable by a radar. In the system of my invention I provide a filling of dielectric within a three-dimensional figure with a non-conducting wall which radically changes all prior analysis of systems of this type. By the improved construction a refracted ray may be totally or partially reflected from the dielectric wall, depending upon its direction. In addition, the relative phase of parallel and perpendicular components of the wave reflected from a dielectric interface differs from that obtained at a conductive wall. According to my invention the reflective properties of the dielectric-filled corner reflector are determined by the reflective properties of the dielectric wall interface for effecting orientation of the refracted ray.

Referring to the drawings in more detail, reference character 1 designates a conducting wall of a corner reflector for use with circularly-polarized radars associated with a complementary conducting wall 2. The walls 1 and 2 are triangularly-shaped and terminate in an open triangularly-shaped side constituting the bottom of the corner reflector. This open bottom comprises an air-dielectric interface for the figure represented at 3. The sides 1 and 2 and the open bottom 3 define a three-dimensional triangularly-shaped figure in which there is deposited a filling of dielectric low-loss material with a dielectric constant in the range 2–4. I have found "Polystyrene" highly suitable as the dielectric filling for the three-dimensional figure.

In Fig. 1, I have designated appropriate dimensions and angular coordinates used in tests of a model reflector of this design. The dielectric constant of the filling material may lie in the range from 2 to 4, with minor modifications to the performance calculated for a dielectric constant of 2.6. For a dielectric constant of 2.6, the response of this reflector to circularly-polarized radars is within 1.5 decibels of the response of a conventional triangular corner reflector of the same size to linearly polarized radars. The region of aspects for which comparison is made includes all aspects within 20° of the symmetry axis of either corner. The performance of the dielectric reflector is not affected by large changes in the radar frequency. That is to say, the relative response of the dielectric reflector to radars of linear polarization is approximately equal to that obtained with radars of circular polarization and this rule applies at all frequencies of interest. In addition, the response of the corner reflector of my invention to linearly-polarized radars is approximately the same as the response of a conventional triangular corner reflector of the same size. In certain applications of my invention I have used a paraffin filling for the dielectric filler 4 because of ease in fabrication with excellent results in returning circularly-polarized waves, even though the dielectric constant of this filling (2.15) is below the minimum dielectric constant of 2.3 which I recommend for the filling in order to maintain best coverage within 20° of the symmetry axis.

In Fig. 2 I have shown a corner reflector constructed in accordance with my invention using a spherical coordinate system with the polar axis coinciding with one of the corner legs, that is, the line of intersection walls 1 and 2 in this instance. The spherical coordinate system of Figs. 1, 2 and 5 is computed from the relationship of $\theta$, $\phi$. The spherical coordinates of an incident ray or line of sight from the radar to the corner as shown in Figs. 5 and 2 are written $(\theta, \phi)$ whereas the spherical coordinates of point A on the incident ray or line of sight are $(a, \phi, \theta)$, where: $a$ is the radius vector of point A or distance OA; $\phi$ is the angle between OM and the positive axis ON of the plane of measurement, where OM is the projection of OA on the $x$—$y$ plane and axis ON is the line of intersection between the plane of measurement and the $x$—$y$ plane (the plane of measurement being perpendicular to the $x$—$y$ plane and at an angle of 45° with the $x$—$z$ and $z$—$y$ planes); and $\theta$ is the angle between the positive $z$-axis, or polar axis in this case, and the line of sight or incident ray as represented by OA. In Fig. 3 I have used the spherical coordinate system $\delta$, $\omega$, in laying out the corner reflector with the polar axis along the symmetry axis of the corner as shown. It will be convenient to describe the attitude of the corner reflector to the illuminating radar by the $\delta$, $\omega$, coordinates of the line of sight, or a point P along the line of sight would be described by the spherical coordinates $(r, \delta, \omega)$, in which: the radius $r$ is the perpendicular distance from the polar axis to the point P on the line of sight; $\omega$ is the angle, in a plane parallel with the face of the corner, between the radius $r$ and the center line of the plane parallel with the face of the corner corresponding to center line ST of the corner face; and $\delta$ is the angle between the polar axis and the line of sight on which the point P is located. This spherical coordinate system is also used in Figs. 4 and 13. A typical ray of the illuminating beam will arrive along the radius with coordinates $\delta_0$, $\omega_0$, and undergo reflection as well as refraction at the face of the corner. The transmission coefficients will differ for the components parallel and perpendicular to the plane of incidence. If the attitude of the corner is restricted to a range of aspects where $\delta_0 \leq 30°$, the voltage transmission coefficient is never less than 0.95 for a dielectric constant of 2.6, so that the effects due to reflection at the corner face are minor, and can be neglected for the present. A more important effect is the change in the coordinates of the refracted ray within the corner. It is found from Snell's law that the refracted ray coordinates are given by $\delta_1$, $\omega_1$, where $$\sin \delta_0 = \sqrt{\epsilon_1} \sin \delta_1 \quad (1)$$
$$\omega_0 = \omega_1$$

The beam of parallel rays incident upon the corner from a direction $\delta_0$ is refracted into a parallel pencil at a smaller angle $\delta_1$ from the symmetry axis. The $\omega$ coordinate is unchanged.

If all three walls of the corner were conducting, the analysis from this point would be the same as that given by Spencer, in Optical Theory of the Corner Reflector, Radiation Laboratory, RL 433, 1944. The refracted ray would undergo reflection from each of the three walls, and emerge parallel to the incident ray. The triple-reflected ray pencil is limited by the entrance and exit apertures of the corner reflector, forming a six-sided region with aperture less than that of the entire corner. Spencer has given the equivalent apertures as a function of the $\delta$, $\omega$ coordinates of the line of sight, so that the variation of echo area with $\delta$ and $\omega$ may be determined. Fig. 4 shows the coverage pattern obtained from a conventional triangular corner reflector using Spencer's analysis. The curves shown in Fig. 4 are constant echo area curves for 0.5 decibel increments, the peak echo area occurring at $\delta = 0°$. These echo areas are obtained with linearly-polarized radars. For circularly-polarized radars, the sense of the circularly-polarized wave is reversed upon reflection from each conducting wall, so that after three reflections, the returning wave is of opposite sense to the incident wave. For this reason it is not received by the radar, and this is the reason why conventional corner reflectors are not used with circularly-polarized radars.

The presence of a dielectric or non-conducting wall modifies the foregoing analysis and leads to a different result. The refracted ray may be totally or partially reflected from the dielectric wall, depending upon its direction. In addition, the relative phase of parallel and perpendicular components of the wave reflected from a dielectric interface differs from that obtained at a metallic wall. It can be shown that the reflective property of a corner reflector with one non-metallic face is identical to that of the non-metallic wall itself. That is, given a corner reflector as shown in Fig. 5 with two conducting faces 1 and 2 and one homogeneous face 5 of dielectric or lossy material, the reflective properties of the corner at an aspect $\theta$, $\phi$ for a spherical coordinate system, are those of the non-metallic interface for incidence at the angle $\theta$ from the normal. The reflective properties of the dielectric-filled corner are thus determined by the reflective properties of the dielectric wall 5 at the interface at the same $\theta_1$ orientation to the refracted ray.

Figure 9:
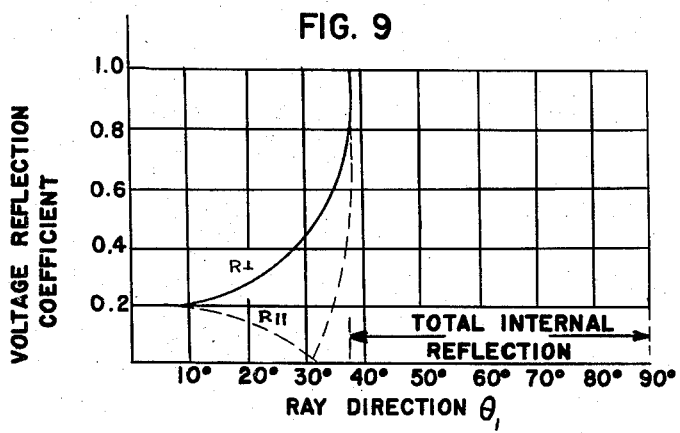
Fig. 9 is a graph showing the relationship of the voltage reflection coefficient as compared to ray direction at a plane interface formed by air and a material of dielectric constant 2.6.
Figure 10:
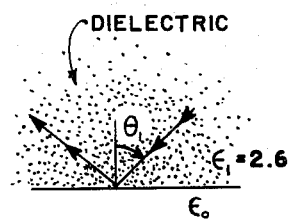
Fig. 10 is a theoretical view showing the direction of a typical ray in the dielectric material as considered in Fig. 9.
Figure 11:
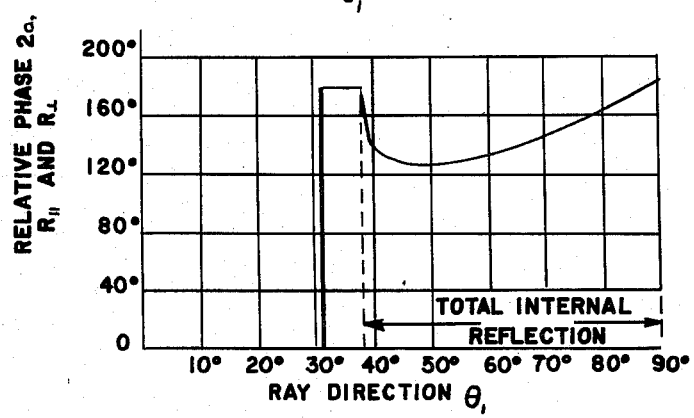
Fig. 11 is a graph showing the relative phase compared to ray direction when using the air-dielectric interface of Fig. 10.

To express the refracted ray in $\theta_1$, $\phi_1$, coordinates, the $\delta_1$, $\omega_1$ coordinates must be transformed. When this is done, it is found that the range of $\theta$, for the refracted ray is as shown in Fig. 7 for incident rays in the plane $\omega=0°$ as represented in Fig. 3. This plane is chosen for illustration because the $\delta_1$, $\omega_1$ to $\theta_1$, $\phi_1$ transformation is simplified there. The reflective properties of the dielectric interface are shown in Figs. 9, 10 and 11. Reflection coefficients for parallel and perpendicular components are shown, together with the relative phase of these two components. The relative phase of these two components would be zero for a metal wall regardless of incidence angle, assuming perfect conductivity. Thus a relative phase shift of 180° is obtained at angles greater than the critical angle, and in the region of total internal reflection, the relative phase shift varies with angle reaching a minimum of about 128° at $\theta_1=50°$. Comparing Figs. 7; and 9 and 11, it will be understood that the refracted ray is totally reflected at the interface, providing $\delta_0 \leq 20°$. Total reflection will always occur over this range of $\delta_0$ if $\epsilon$ is greater than 2.3.

A circularly-polarized wave will not have its sense reversed upon reflection from a plane interface if the relative phase of perpendicular and parallel reflected components is 180°. This observation assumes that coordinate directions are chosen so that the relative phase would be zero for reflection by a metallic interface. If the relative phase differs from 180°, a portion of the reflected energy will not have its case reversed. In the sense of total reflection, the fraction of reflected energy with unreversed sense is equal to $\sin^2 a$, where $2a$ is the relative phase. The circularly-polarized response for the dielectric interface can now be determined by use of the curves of Fig. 7 and 9 and 11. The relative response is plotted in Fig. 12 as a function of $\delta_0$ in the plane $\omega=0°$, for a dielectric constant of 2.6. The response is relative to that from an ideal interface with 180° relative phase at all incidence angles.

Figure 12:
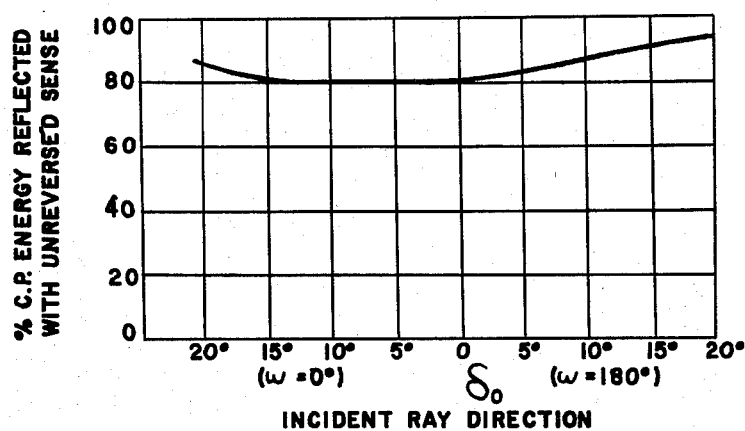
Fig. 12 is a graph showing the percentage of circularly-polarized energy reflected with unreversed sense compared to the incident ray direction using the air-dielectric interface of Fig. 10.

When the response shown in Fig. 12 is combined with the original coverage diagram of Fig. 4 and the effects of reflection and refraction at the face of the corner are taken into account, a coverage diagram for the dielectric corner is obtained. Fig. 13 shows the computed coverage of the dielectric corner of Fig. 1 with $\epsilon=2.6$ for circularly-polarized radars. Constant echo curves are shown for 0.2 decibel increments relative to the maximum, which occurs at $\delta_0=0°$ and is 1.4 decibels below the peak return from a conventional corner reflector of the same size for linear polarizations. Comparison of Fig. 4 with Fig. 13 shows that the response from the dielectric corner is very flat and that it is never more than 1.5 decibels below the linearly-polarized response for the same size conventional corner reflector, if $\delta_0 \leq 20°$.

In Fig. 14 I have shown a graph comparing the measured echo patterns for conventional corner reflectors compared to a dielectric-filled reflector at 9090 mc. Three different curves are shown at 6, 7 and 8, where curve 6 shows the characteristic for a conventional triangular corner using linear polarization ($E\phi$); curve 7 shows the characteristic for a dielectric-filled reflector using linear-polarization ($E\phi$); and curve 8 shows the characteristic for a dielectric-filled reflector using circular polarization. The curves are plotted with relative echo area in decibels as ordinates and azimuth angle $\theta$ in plane of measurement as abscissa. In the particular test from which these curves were made paraffin was used for filling the reflector in the case of curves 7 and 8. From a comparison of three curves it will be seen that the dielectric reflector yields approximately equal return for both linear and circular polarizations and that this return is as large and as broad as obtained from a conventional triangular corner reflector of the same size with linear polarization. Although the data presented apply only to one frequency and a single plane of measurement, my observations are that measurements at other frequencies or in other planes of measurement will yield substantially the same results. The tests have established all of the principles of my invention as sound and provides rules for the manufacture and production of corner reflectors possessing predictable precision characteristics for operation in radar systems.

In plotting the curves shown in Fig. 13 the peak response was determined to be 1.4 db below that of the peak response in the system depicted in Fig. 4.

I have found the corner reflector for use with circularly-polarized radars as set forth herein adequate for various applications. The reflector design is independent of frequency so that a single reflector may be used to cover wide frequency bands. The reflector may also be used as a standard target for circularly-polarized echo measurements.

While I have described my invention in certain preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A corner reflector for use with circularly-polarized radars comprising a three-dimensional figure in the form of a regular triangular pyramid having lateral faces that are mutually orthogonal, said pyramid being constituted by a low-loss dielectric material, two of said lateral faces having electrically conducting coatings thereon and the third lateral face being uncoated, said coated faces comprising reflecting walls, and said uncoated face comprising an aperture for the passage of rays reflected by said coated faces.

2. A corner reflector for use with circularly-polarized radars as set forth in claim 1 in which said low-loss dielectric material is polystyrene.

3. A corner reflector for use with circularly-polarized radars as set forth in claim 1, in which said dielectric material has a dielectric constant in the range 2–4.

4. A corner reflector for use with circularly-polarized radars comprising a three-dimensional figure formed by a pair of electrically conducting walls extending at an angle to each other in intersecting vertical planes, a third wall for said figure constituted by an air-dielectric interface and a filling of polystyrene extending over the surfaces of said walls and filling the area therebetween.

5. A corner reflector for use with circularly-polarized radars, as set forth in claim 1, in which said pair of lateral faces and the electrically conducting coatings thereon constitute walls that are triangular in contour with the bottom edges thereof extending in a plane coplanar with said uncoated face and wherein said low-loss dielectric material extends in an inclined plane from the front edge of said uncoated face to a rearward position coincident with the intersection of said vertical planes of said pair of walls containing the electrically conducting coating thereon.

References Cited in the file of this patent

UNITED STATES PATENTS 2,786,198   Weil et al. _____ Mar. 19, 1957